Nov. 13, 1962 — J. A. WOOD — 3,063,528
CLUTCH LOCKOUT
Filed March 30, 1959 — 2 Sheets-Sheet 1
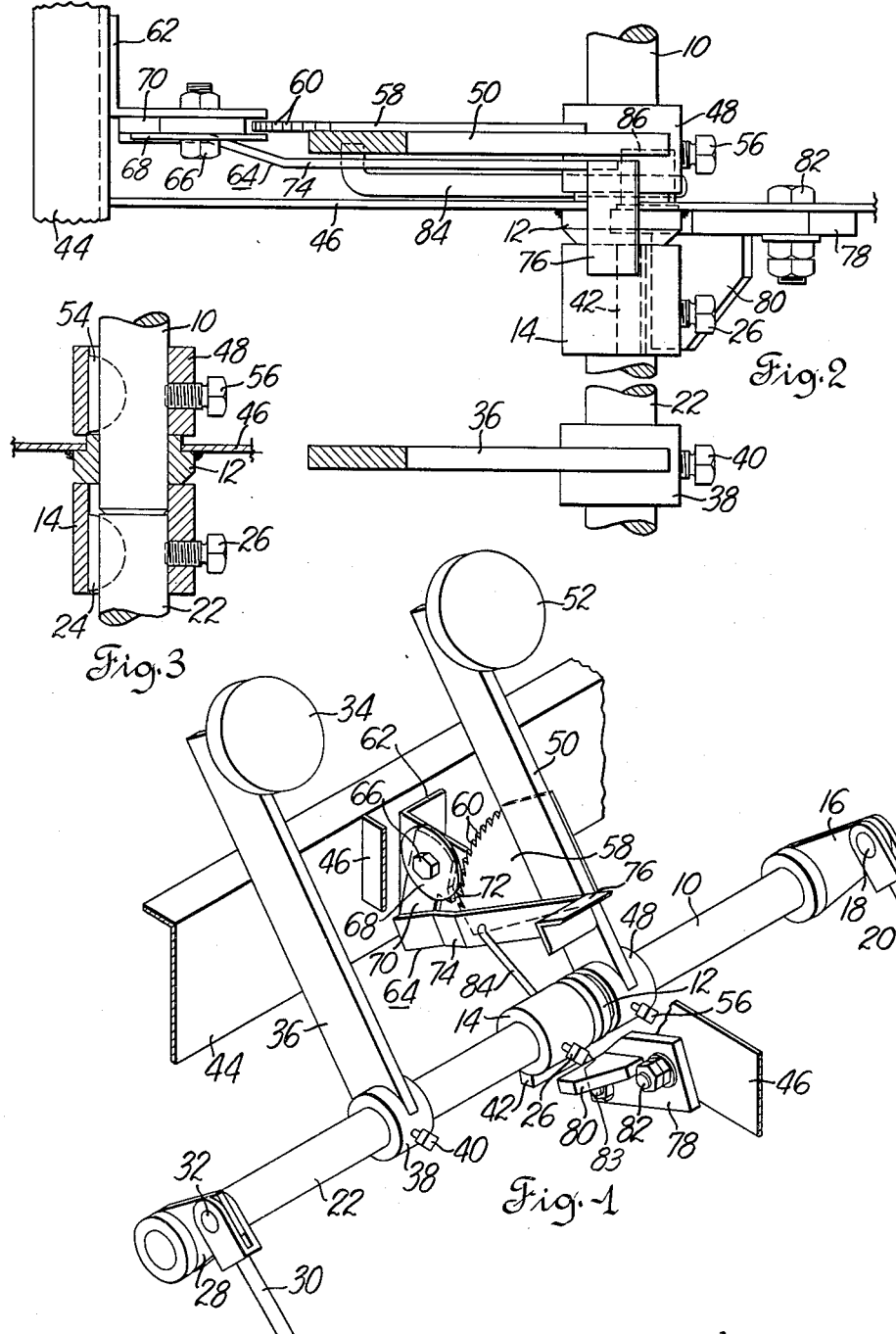
Inventor
John A. Wood Nov. 13, 1962   J. A. WOOD   3,063,528
CLUTCH LOCKOUT
Filed March 30, 1959   2 Sheets-Sheet 2
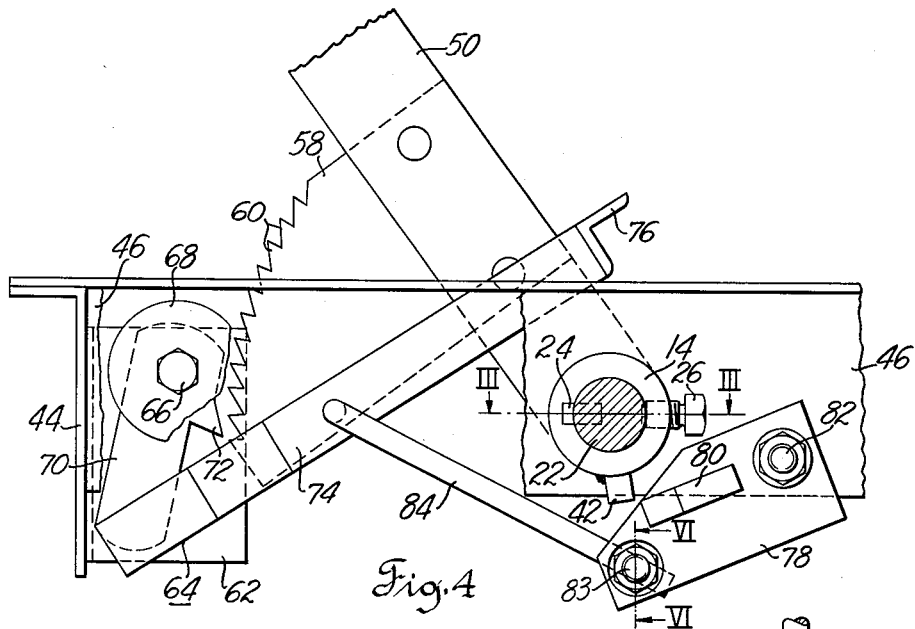
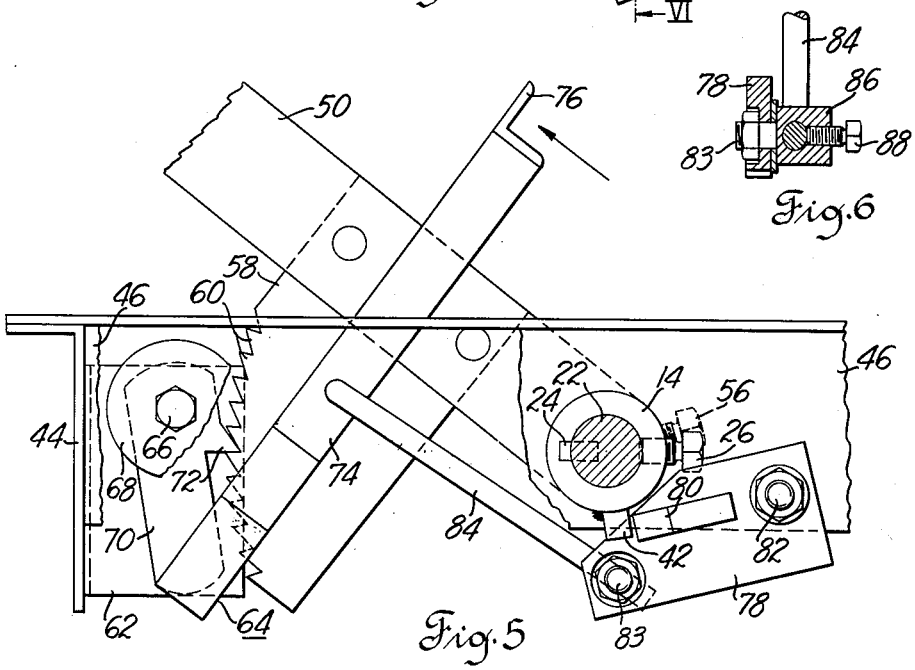
Inventor
John A. Wood
by Robert W. Lathrun
Attorney

United States Patent Office

3,063,528
Patented Nov. 13, 1962

3,063,528
CLUTCH LOCKOUT
John A. Wood, Independence, Mo., assignor to Allis-Chalmers Manufacturing Company, Milwaukee, Wis.
Filed Mar. 30, 1959, Ser. No. 802,988
2 Claims. (Cl. 192—13)

This invention relates to mechanical interlocks and more particularly to a control device for interrelating the functions of a vehicle clutch actuating mechanism and a vehicle brake actuating mechanism.

A continuing problem in the vehicle field has been the operator who sets a brake and thereafter, forgetting that he has done so, puts the vehicle into motion. This difficulty is acute in vehicles with parking or transmission brakes where the vehicle power plant has sufficient power or is geared low enough to operate against the restraining force of the brake without perceptible difficulty. This has always caused problems of brake wear, but in the case of a vehicle such as a grain combine, an unreleased brake can become so hot as to create a fire hazard in a grain field.

It is an object of this invention to provide an improved brake control system.

It is a further object of this invention to provide for an interrelationship between the clutch and brake control mechanisms of a vehicle in such a manner that the vehicle cannot be set in motion by the vehicle's power train until the controlled brake has been released.

It is a further object of this invention to provide a control system that will protect a vehicle braking system from damage caused by operation of the vehicle in the engaged position of brake adjustment.

It is a further object to prevent the fire hazard that is present when a vehicle brake becomes severely overheated.

In the drawings:

FIG. 1 shows a three-quarter view of the clutch and brake actuating mechanism with a central support member partially broken away;

FIG. 2 shows a plan view of the clutch and brake actuating mechanisms with the actuating shafts interrupted and the operating levers partially broken away and shown in section;

FIG. 3 is a section view taken along line III—III in FIG. 4 showing the juncture of the two coaxial actuating shafts;

FIG. 4 is a partial side elevation of the control mechanism of this invention in noninterlocked condition;

FIG. 5 is a partial side elevation showing the control mechanism of this invention in its interlocked condition; and FIG. 6 is a section view taken along line VI—VI of FIG. 4.

Referring to FIG. 1, the brake actuating shaft 10 is supported centrally by the journal bearing sleeve 12 and terminates at one of its ends within the hub 14. At this terminal location the brake actuating shaft 10 is free to rotate independently of the hub 14. At the opposite end of the brake actuating shaft, a brake crank 16 is rigidly mounted for movement in unison with brake actuating shaft 10. Pivotally attached to the brake crank 16 by pin 18 is the brake rod 20 which connects to and actuates the brake (not shown) in response to operation of the actuating mechanism.

The clutch actuating shaft 22 terminates at one end within the hub 14 to which it is securely affixed by a key 24 shown in FIG. 3 and the set screw 26. Also rigidly associated with the hub 14 is a protruding stop element 42 which is formed either as an integral part of the hub or is a separate member affixed to the hub by a means such as welding. At the opposite end of the clutch actuating shaft 22 is a clutch crank 28 to which a clutch rod 30 is pivotally attached by pin 32. The clutch pedal 34 is secured to a clutch lever 36 which is in turn rigidly attached to a hub 38. The hub 38 is rigidly associated with the clutch actuating shaft 22 for movement in unison therewith by a key (not shown) and the set screw 40.

A portion of the vehicle frame 44 is shown with one end of a cross support member 46 attached thereto. This support member 46 with its center section broken away has welded to it the journal bearing sleeve 12 through which is journaled the brake actuating shaft 10. Rigidly associated with the brake actuating shaft 10 is a hub 48 on which is mounted a brake lever 50 and to which in turn a brake pedal 52 is secured. This hub is secured to the brake actuating shaft by a key 54 shown in FIG. 3 and the set screw 56. Rigidly attached to the brake lever 50 is a quadrant 58 on which is formed an arcuate series of ratchet teeth 60 concentric with the brake actuating shaft.

Attached to the frame member 44 is an angle support 62. A latch assembly 64, pivotally connected by bolt 66 to the angle support 62, functions as a movable retaining element. The bolt 66 also passes through a washer 68 which cooperates with the angle support to form a guide for the quadrant 58. The latch assembly is composed of a dog portion 70 with an engaging pawl 72, a rigidly attached arm member 74 and an angle actuating section 76 which is also rigidly secured to the arm member 74. Also pivotally connected to the support member 46 is an arm member 78 on which is mounted a cooperating stop member or element 80. The arm member 78 is pivotally mounted by means of the bolt 82 and pivots about the axis of this bolt. The arm member 78 and the arm 74 of the latch assembly are interconnected by means of a link 84 which is pivotally connected at each end respectively to these two members.

FIG. 3 shows in plan view the support member 46 on which is welded the journal bearing sleeve 12. This view further shows the terminal portion of the brake actuating shaft 10 extending into the hub 14 to thereby support the end portion of the clutch actuating shaft 22. The key 24 and the set screw 26 cause the hub 14 to be rigidly associated with the clutch actuating shaft 22 and move in unison therewith.

The coaxial clutch and brake actuating shafts are further stabilized, supported and prevented from moving outwardly along their common axis by being journaled through frame members (not shown) at an intermediate location between the lever hub and the crank members of the respective actuating shafts. Suitable stop means (not illustrated) are utilized in conjunction with the journaled portions to prevent axial movement.

FIG. 2 in plan view more clearly shows the orientation of the coaxial clutch and brake actuating shafts 22 and 10 respectively with regard to their association with the cross support member 46 and the journal bearing collar 12. Also clearly shown is the cooperation between the angle support 62 and the washer 68 which are pivotally connected to the latch assembly 64 and serve to guide the arced section of ratchet teeth 60 of the quadrant 58.

FIG. 4 shows a partial side elevation of the control mechanism of this invention in a brake released or disengaged position. The brake lever is shown at the point of maximum clockwise travel about the axis of the brake actuating shaft. The latch assembly 64 is in a position where the dog member 70 on which is mounted the pawl 72 will not engage the teeth 60 of the quadrant 58 upon a counterclockwise movement of the brake lever 50. In this position the arm member 78 is pivoted to a lowered position dropping the cooperating stop element 80 sufficiently to remove it from the path of the stop element 42 allowing the hub 14 and the clutch actuating shaft 22 to be pivotally operated without restraint.

FIG. 5 shows the control mechanism locking the brake in an applied or engaged position. The brake lever 50 has been rotated counterclockwise and the control mechanism has been engaged by manually applying an upward pressure to the actuating portion of the latch assembly in the direction shown by the arrow. The latch assembly 64 and the quadrant 58 comprise a locking means wherein by lifting the actuating section 76 of the latch assembly upward and forward as indicated by the arrow, the pawl 72 has been rotated into engagement between a pair of the ratchet teeth 60 on the quadrant 58 thereby securing the brake lever 50 in the brake applied position. Simultaneously the pivotally connected motion transmitting link member 84 has rotated the arm member 78 in a clockwise direction about the axis of the bolt 82 thereby bringing the complementary stop element 80 into the operative position in the arcuate path of the stop element 42 associated with the hub 14. This adjustment of a movable stop means serves to disable the clutch actuating mechanism by blocking the counterclockwise movement of the clutch actuating shaft 22.

FIG. 6 shows the pivotal connection between the link member 84 and the arm member 78 that is effected by the bolt 83. An adjustable stop is provided between the block 86 and the link element 84 by means of the set screw 88. This adjustment allows for a variation in the orientation of the latch and cooperating stop element with respect to one another to coordinate the operation of the two portions of the control.

In operation, both the brake and clutch actuating mechanisms are freely operable without interference from the interconnecting control mechanism. When it is desired to set and lock the brake in an engaged position, it is necessary to depress the brake pedal and actuate the latch member to engage the control mechanism. To disengage the control mechanism the vehicle operator need only apply a slight further pressure to the brake pedal. Upon such further application of pedal pressure the control mechanism returns by gravity to the inoperative position.

Used in conjunction with a vehicle wherein it is necessary to place the transmission in a neutral condition to start the engine, it becomes impossible to set the vehicle in motion with the vehicle power train without first disengaging the brake. If the transmission of the vehicle is already in a neutral position, the engine may be started but the clutch cannot be disengaged to shift the transmission from neutral into gear until the brake has been released to free the clutch and allow disengagement. If on the other hand the vehicle has been left with the transmission in gear, it will not be possible to start the engine until the transmission has been placed in neutral. This requires disengagement of the clutch, and the herein disclosed interlock mechanism prevents such disengagement until the brake locking mechanism has been released.

When an operator stops the vehicle with the motor running and locks the parking brake in engaged position using the interlocking control mechanism of this invention, it will not be possible for the vehicle to again be set in motion by means of the power train until the brake locking means and correspondingly the clutch disabling mechanism has been released.

While in the foregoing a preferred embodiment of the invention has been disclosed, it should be understood that it is not intended to limit the invention to the particular forms and details described hereinabove and that the invention includes such other forms and modifications as are embraced by the scope of the appended claims.

What is claimed is:

1. In a vehicle having clutch and brake means for driving and retarding its running gear, the combination of: a stationary support; a control lever for said brake means pivotally mounted on said support for movement to brake applied and brake released positions; locking means for releasably securing said brake control lever in said brake applied position; said locking means including a movable retaining element mounted on said support for adjustment into and out of a lock establishing position; an actuating lever for said clutch means pivotally mounted on said support for movement to clutch engaged and clutch disengaged positions; movable stop means for blocking and unblocking movement of said clutch actuating lever from said clutch engaged to said clutch disengaged position; and motion transmitting means operatively interposed between said retaining element and said stop means so as to block clutch disengaging movement of said clutch actuating lever while said retaining element is in said lock establishing position, and so as to unblock clutch disengaging movement of said clutch actuating lever by movement of said retaining element out of said lock establishing position.

2. The combination as set forth in claim 1 wherein said movable stop means comprises a stop element connected with said clutch lever for movement thereby, and a complementary stop element pivotally mounted on said support and operatively connected with said motion transmitting means, so that movement of said retaining element into and out of said lock establishing position will move said complementary stop element into and out of an operative position in the path of movement of first stop element.

References Cited in the file of this patent

UNITED STATES PATENTS

| | | |
|---|---|---|
| 1,054,337 | Center | Feb. 25, 1913 |
| 1,107,915 | De Buhr | Aug. 18, 1914 |
| 1,576,396 | Wood | Mar. 9, 1926 |
| 1,817,943 | Rockwell | Aug. 11, 1931 |
| 1,876,498 | Hawkins | Sept. 6, 1932 |
| 2,229,056 | Dick | Jan. 21, 1941 |
| 2,411,455 | Mullins et al. | Nov. 19, 1946 |
| 2,773,573 | Erdahl | Dec. 11, 1956 |
| 2,816,456 | Senkowski et al. | Dec. 17, 1957 |

FOREIGN PATENTS

| | | |
|---|---|---|
| 148,406 | Sweden | Jan. 11, 1955 |
| 969,350 | Germany | May 22, 1958 |